(12) United States Patent
Zhang et al.

(10) Patent No.: US 7,630,886 B2
(45) Date of Patent: Dec. 8, 2009

(54) HOCHWALD CONSTRUCTION OF UNITARY MATRIX CODEBOOKS VIA EIGEN COORDINATE TRANSFORMATIONS

(75) Inventors: Jianzhong Zhang, Irving, TX (US); Anthony Reid, Plano, TX (US)

(73) Assignee: Nokia Corporation, Espoo (FI)

( * ) Notice: Subject to any disclaimer, the term of this patent is extended or adjusted under 35 U.S.C. 154(b) by 416 days.

(21) Appl. No.: 11/119,513

(22) Filed: Apr. 29, 2005

(65) Prior Publication Data

US 2006/0161432 A1 Jul. 20, 2006

Related U.S. Application Data

(60) Provisional application No. 60/644,375, filed on Jan. 14, 2005.

(51) Int. Cl.
*G10L 19/12* (2006.01)
(52) U.S. Cl. .................. 704/222; 704/221; 704/230
(58) Field of Classification Search ............... 704/204, 704/219, 220, 222, 223, 500–504, 221, 230, 704/229
See application file for complete search history.

(56) References Cited

U.S. PATENT DOCUMENTS 5,732,389 A * 3/1998 Kroon et al. ............... 704/223

2003/0130003 A1 7/2003 Won .......................... 455/522

OTHER PUBLICATIONS

"Part 16: Air Interface for Fixed and Mobile Broadband Wireless Access Systems Amendment for Physical and Medium Access Control Layers for Combined Fixed and Mobile Operation in Licensed Bands", Draft IEEE Standard for Local and metropolitan area networks, Dec. 23, 2004, pp. 1-484.

Hochwald, B. M. et al., "Systematic Design of Unitary Space-Time Constellations", Sep. 2000, pp. 1962-1973, IEEE Transactions on Information Theory, vol. 46, No. 6.

Zhang, J. et al., "Closed-Loop MIMO Precoding with CQICH Feedbacks", Jan. 10, 2005, pp. 1-12, IEEE 802.16 Broadband Wireless Access Working Group http://ieee802.org/6.

"Limited Feedback Precoding for Orthogonal Space-Time Block Codes", David J. Love et al., IEEE 2004, pp. 561-565.

* cited by examiner

*Primary Examiner*—Huyen X. Vo
(74) *Attorney, Agent, or Firm*—Harrington & Smith, PC (57) ABSTRACT

A method of deriving a codebook including deriving a first codeword $P_1$ in Euclidean coordinates, transforming the first codeword into eigen-coordinates, applying a Hochwald construction to the first codeword in eigen-coordinates to derive a plurality of codewords in eigen-coordinates and transforming the plurality of codewords in eigen-coordinates into a plurality of codewords in Euclidean coordinates to form the codebook.

28 Claims, 2 Drawing Sheets

HOCHWALD CONSTRUCTION OF UNITARY MATRIX CODEBOOKS VIA EIGEN COORDINATE TRANSFORMATIONS

CLAIM OF PRIORITY FROM COPENDING PROVISIONAL PATENT APPLICATION

This patent application claims priority under 35 U.S.C. §119(e) from Provisional Patent Application No. 60/644,375, filed Jan. 14, 2005, the disclosure of which is incorporated by reference herein in its entirety.

FIELD

This invention relates generally to wireless communication systems. More particularly embodiments of the invention pertain to the creation and utilization of unitary matrix codebooks.

BACKGROUND

Structured limited-feedback closed-loop MIMO preceding methods have been developed for efficiently transmitting data from a mobile station (MS) to a base station (BS) in the context of wireless communication between the two. Such methods do not require the complete feedback of either the preceding weight matrix W or the channel matrix H. Instead, for each pair of transmit antenna number $N_t$ and spatial stream number $M_t$, a matrix codebook is constructed that is formed of a set of preceding matrices. Both the BS and MS have access to the matrix codebook. Consequently, in order to transmit feedback to the BS, the MS needs only to transmit the index to a preceding matrix contained in the matrix codebook. Such an index is typically formed as a string of bits wherein each bit assumes a binary value. The set of the matrices, or codebook, can be constructed to achieve a desired performance and feedback bandwidth trade-off.

Once the content of the codebook is fixed, the number of feedback bits that are required to construct the index to the codebook does not grow with the size of the preceding matrix W as is required when implementing existing approaches. It has been shown that methods directed to the structured preceding of codebooks can achieve near-optimal preceding MIMO performance requiring a reasonably low number of feedback bits.

Central to methods directed to structured MIMO preceding is the design of unitary matrix codebooks. Preferably, such codebooks are designed in such a way that the matrices, or codewords, forming the codebook are as evenly distributed in the Grassmannian manifold as possible. In mathematics, a Grassmannian is the space of all k-dimensional subspaces of an n-dimensional vector space V. One approaches the construction of an optimal codebook as one is better able to maximize the minimum chordal distance of the codebook. As used herein, "chordal distance" refers to the distance between matrices, or codewords, in the multidimensional space comprising the Grassmannian manifold.

While a codebook generated by the random computation and distribution of codewords within the Grassmannian manifold provides the best possible codebook in terms of minimum Chordal distance, it is not computationally practical to construct such a codebook for systems with large amounts of transmit antennas and spatial streams. To address this constraint, a block-circulant construction method, also called a Hochwald construction method, has been proposed as a systematic construction method which avoids the computational burden of a direct random search method. The Hochwald method provides near-optimal codebooks that facilitate efficient storage and retrieval of the codewords contained therein resulting from the non-computationally intensive parameterization of the codebook. Furthermore, the block-circulant distance structure also facilitates the so-called subspace-tracking method in a precoding based MIMO-OFDM. In the Hochwald design, a codebook is fully specified once the first codeword $P_1$ and a diagonal rotation matrix Q are provided. The other codewords in the codebook are given by (Here $2^L$ is the cardinality of the codebook and each codeword is a matrix of size $N_t \times M_t$):

$$P_l = Q^l P_1, \text{ for } l=2 \ldots 2^L, \quad (1)$$

where Q is a diagonal matrix fully parameterized by an integer vector $$u \triangleq [u_1, \ldots, u_{N_t}]:$$

$$Q = \begin{bmatrix} e^{j\frac{2\pi}{2^L}u_1} & & 0 \\ & \ddots & \\ 0 & & e^{j\frac{2\pi}{2^L}u_{N_t}} \end{bmatrix}$$

Furthermore, in this design, the first codeword $P_1$ is chosen to be a $N_t \times M_t$ sub-matrix of the $N_t \times N_t$ Discrete Fourier Transform (DFT) matrix $D_{N_t}$ whose (m,n) element is specified as $$(D_{N_1})_{m,n} = e^{j\frac{2\pi}{N_t}(m-1)(n-1)}$$

where $1 \leq m,n \leq N_t$. Denoting $d_c$ as the $c^{th}$ column of the matrix $D_{N_t}$, the first codeword is the collection of $M_t$ columns parameterized by the set of column indices $$c \triangleq [c_1, \ldots, c_{M_t}], \text{ i.e, } P_1 = [d_{c_1}, \ldots, d_{c_{N_t}}].$$

With reference to Table 1 below, there is tabulated in exemplary fashion the choices of $$u \triangleq [u_1, \ldots, u_{N_t}] \text{ and } c \triangleq [c_1, \ldots, c_{M_t}]$$

for different transmitter antenna numbers $N_t$ between two and four, and spatially multiplexed data stream numbers $M_t$, subject to the constraint that $N_t > M_t$. Note that the choice of $2^L$, the codebook size, is the result of a trade of between performance and the number of required feedback bits.

TABLE 1

| $N_t$ (# of Tx Antennas) | $M_t$ (# of data streams) | $2^L/(L)$ Codebook size/ (feedback bits) | $c \triangleq$ $[c_1, \ldots, c_{M_t}]$ Column indices | $u \triangleq$ $[u_1, \ldots, u_{N_t}]$ Rotation Vector |
|---|---|---|---|---|
| 2 | 1 | 8/(3) | [1] | [1, 0] |
| 3 | 1 | 32/(5) | [1] | [1, 26, 28] |
| 3 | 2 | 32/(5) | [1, 2] | [1, 26, 28] |
| 4 | 1 | 64/(6) | [1] | [1, 8, 61, 45] |
| 4 | 2 | 64/(6) | [0, 1] | [1, 7, 52, 56] |
| 4 | 3 | 64/(6) | [0, 2, 3] | [1, 8, 61, 45] |

Note that each column index $0<=c<=N_t-1$, $c=[0]$ indicates the first column of the DFT matrix D, $c=[1]$ indicates the second column of the DFT matrix D, etc.

Unfortunately, codebooks formed of codewords that are generated in accordance with the Hochwald construction method are subject to various undesirable constraints. Amongst these constraints are the requirement that the energy of any two elements within a single matrix codeword be equal and the total energy of each individual codeword be equal to the total energy of every other individual codeword. While such constraints allow for a straightforward application of the Hochwald construction method, their enforcement results in a distribution of the codewords of a codebook in the Grassmannian manifold that can be improved upon.

It would therefore be preferable to derive a method for performing Hochwald construction that does not suffer from the constraints of the prior art.

SUMMARY

In accordance with an example of the present invention, a method of deriving a codebook comprises deriving a first codeword $P_I$ in Euclidean coordinates, transforming the first codeword into eigen-coordinates, applying a Hochwald construction to the first codeword in eigen-coordinates to derive a plurality of codewords in eigen-coordinates, and transforming the plurality of codewords in eigen-coordinates into a plurality of codewords in Euclidean coordinates to form the codebook.

In accordance with another example of the invention, a data structure embodied on a tangible medium comprises a first codeword $P_I$, and a plurality of codewords $P_l$, $l=2 \ldots 2^L$, where $2^L$ comprises a number of the plurality of codewords wherein $P_l=VQ^lV^HP_I$ where V comprises a unitary matrix comprising eigen vectors, Q comprises a diagonal matrix, and $V^H$ comprises a hermitian eigen matrix.

In accordance with another example of the invention, a mobile station comprises a means for storing a codebook the codebook comprising a first codeword $P_I$, and a plurality of codewords $P_l$, $l=2 \ldots 2^L$, where $2^L$ comprises a number of the plurality of codewords wherein $P_l=VQ^lV^HP_I$ where V comprises a unitary matrix comprising eigen vectors, Q comprises a diagonal matrix, and $V^H$ comprises a hermitian eigen matrix, and a means for accessing the first codeword and the plurality of codewords.

In accordance with another example of the invention, a base station comprises a means for storing a codebook the codebook comprising a first codeword $P_I$, and a plurality of codewords $P_l$, $l=2 \ldots 2^L$, where $2^L$ comprises a number of the plurality of codewords wherein $P_l=VQ^lV^HP_I$ where V comprises a unitary matrix comprising eigen vectors, Q comprises a diagonal matrix, and $V^H$ comprises a hermitian eigen matrix, and a means for accessing the first codeword and the plurality of codewords.

In accordance with another example of the invention, a program of machine-readable instructions, tangibly embodied on an information bearing medium and executable by a digital data processor, to perform actions directed toward the transmission of information, the actions comprising obtaining an information matrix, accessing a codebook to select one of a plurality of indexes corresponding to the information matrix the codebook comprising a first codeword $P_I$, a plurality of codewords $P_l$, $l=2 \ldots 2^L$, where $2^L$ comprises a number of the plurality of codewords wherein $P_l=VQ^lV^HP_I$ where V comprises a unitary matrix comprising eigen vectors, Q comprises a diagonal matrix, and $V^H$ comprises a hermitian eigen matrix wherein each of the first codeword and the plurality of codewords corresponds to a unique one of the plurality of indexes, and transmitting the one of the plurality of indexes.

In accordance with another example of the invention, a program of machine-readable instructions, tangibly embodied on an information bearing medium and executable by a digital data processor, to perform actions directed toward the reception of information, the actions comprising receiving an index, and accessing a codebook to select one of a plurality of codewords corresponding to the index the codebook comprising a first codeword $P_I$, a plurality of codewords $P_l$, $l=2 \ldots 2^L$, where $2^L$ comprises a number of the plurality of codewords wherein $P_l=VQ^lV^HP_I$ where V comprises a unitary matrix comprising eigen vectors, Q comprises a diagonal matrix, and $V^H$ comprises a hermitian eigen matrix wherein each of the first codeword and the plurality of codewords corresponds to a unique one of the plurality of indexes.

DETAILED DESCRIPTION

In an example of the present invention, there is provided an eigen-coordinate transformation based method to improve the minimum Chordal distance of the codebooks generated by the Hochwald construction method. This is achieved, in part, by relaxing at least one constraint of the Hochwald construction so as to render more nearly optimal the distribution of codewords in the multi-dimensional Grassmannian manifold. As noted previously, utilization of the Hochwald construction method results in a codebook wherein the energy distribution among different elements in each individual matrix codeword is equal and fixed from one matrix codeword to every other. That is, for any two matrix codewords $P_{I1}$ and $P_{I2}$, the (i,j) element of each codeword has the same energy, i.e. $||(P_{I1})_{i,j}|^2=|(P_{I2})_{i,j}|^2$.

In an example of the present invention, this constraint is removed to provide a method for generating codebooks with better Chordal distance properties. Specifically, the constraint is relaxed so as to obtain codebooks wherein the minimum Chordal distance of the codebook is more nearly maximized in comparison to instances wherein the constraint is not relaxed. The eigen-coordinate transformation method recited herein removes the above noted constraint by taking advantage of the energy-shifting property of eigen-coordinate transformations while preserving advantageous features of the Hochwald construction such as block-circulant distance distribution of codewords and easy parameterization.

In the following description of an example of the invention, reference is made to the accompanying drawings which form a part hereof, and in which is shown by way of illustration of an exemplary fashion in which the invention may be practiced. It is to be understood that other examples may be utilized, as structural and operational changes may be made without departing from the scope of the present invention.

As noted above, an example of the present invention discloses a method utilizing an eigen-coordinate transformation to provide a systematic way of removing the fixed-energy-distribution constraint in the Hochwald construction. Such a method more nearly maximizes the minimum Chordal distance of a codebook constructed therefrom.

Upon examination of equation (1), it is evident that all of the other codewords $P_l = Q^l P_l$, for $l=2, \ldots 2^L$ are derived from the first codeword $P_l$. This observation makes evident the utility to be gained by removing the fixed-energy distribution constraint by allowing $P_l$ to be an arbitrary unitary matrix, rather than the columns of a DFT matrix as defined in the Hochwald Construction.

However, removal of such a constraint does not fully resolve the shortcomings of the Hochwald Construction as the energy distribution is still fixed from one codeword to another. This is true even though the energy is no longer uniformly distributed within one codeword, as is the case in the Hochwald construction. Therefore, changing the first codeword $P_l$ to be an arbitrary unitary matrix alone is not sufficient to most advantageously optimize the construction of a codebook.

Therefore, an example of the present invention utilizes an eigen-coordinate transformation to achieve variations in energy distribution among different matrix codewords. First, since Q is a diagonal matrix, it can be represented as a part of an eigen-decomposition of some matrix S:

$$S \triangleq VQV^H \quad (2)$$

where V is a unitary matrix of size $N_t \times N_t$ consisting of the resultant eigen vectors. Next, the matrix Q can be replaced with matrix S in equation (1) to arrive at an improved Hochwald construction:

$$P_l = S^l P_l = (VQV^H)^l P_l = VQ^l V^H P_l, \text{ for } l=2, \ldots 2^L, \quad (3)$$

where the parameterization of eigen-matrix V is discussed more fully below.

Figure 1:
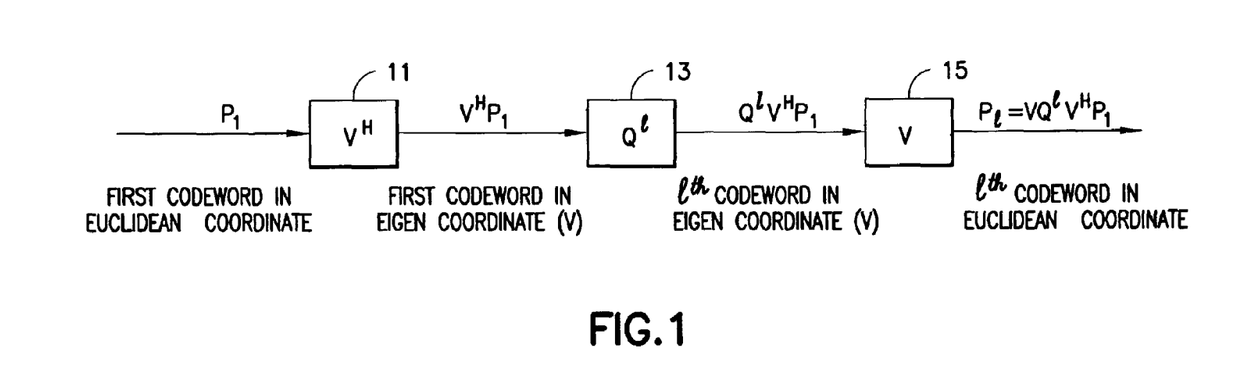
FIG. 1 is a flow chart of an embodiment of the methodology of the present invention.

With reference to FIG. 1, there is illustrated a flow chart of an example of the improved Hochwald construction of the present invention. First, the first codeword, $p_l$, is transformed into the first codeword in eigen-coordinates at block 11 by applying the hermitian eigen-matrix $V^H$ to $p_l$ to yield $V^H P_l$. The Hochwald construction is then applied to the first codeword in eigen-coordinates, $V^H P_l$, at block 13 to derive the lth codeword in the eigen-coordinate, $Q^l V^H P_l$. The lth codeword in the eigen-coordinate is then transformed back to the Euclidean coordinate with matrix V at block 15 to generate each final codeword $P_l = VQ^l V^H P_l$.

Because this methodology applies the Hochwald Construction to the first codeword transformed into eigen-coordinates, the intermediate codewords $Q^l V^H P_l$, for $l=1, \ldots, L$ still have the same energy distribution in the eigen-coordinates defined by V. However, the final codewords, $P_l = VQ^l V^H P_l$, will have different energy distributions once transformed into Euclidean coordinates. For vector codebooks, it is sometimes convenient to remove the phase of the first element in each codebook by $\tilde{P}_l = P_l e^{-j\phi_l}$ for $l=2, \ldots, 2^L$, where $\phi_l$ is the phase of the first entry of $P_l$. In this alternative representation of codebook that is strictly equivalent to the original codebook, the first element of each codeword is real.

Figure 2:
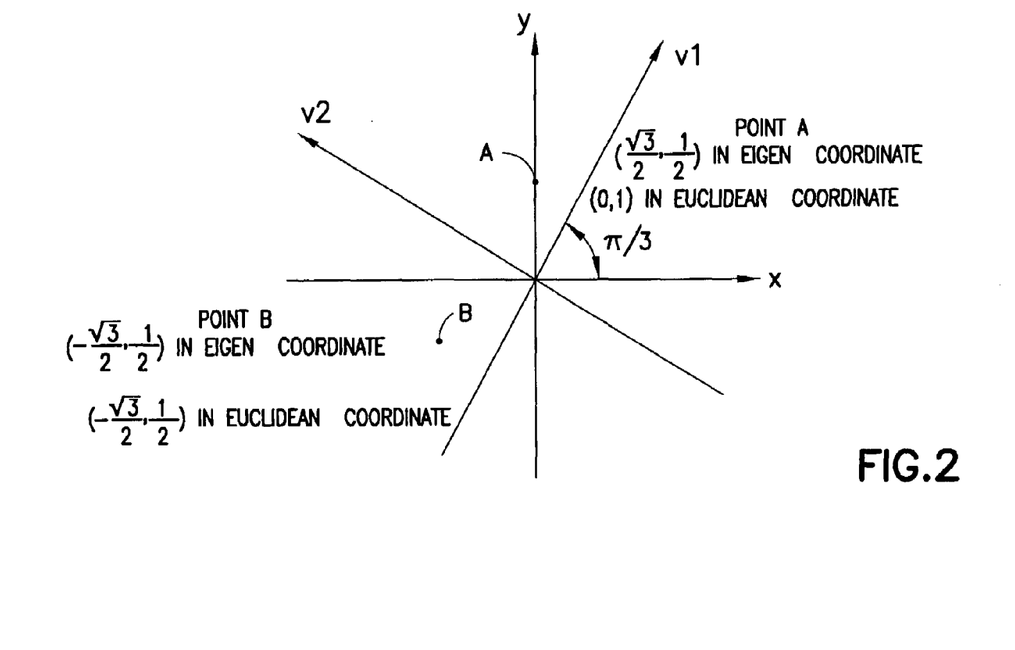
FIG. 2 is an illustration of an exemplary energy distribution in both eigen and Euclidean space between codewords of a codebook.

With reference to FIG. 2, there is illustrated in exemplary fashion, the different energy distributions amongst elements of a codeword produced by the energy-shifting properties of eigen-coordinate transformation. Points A and B are elements within a single codeword derived according to an example of the present invention. The x and y axes represent Euclidean space while eigen vectors v1 and v2 represent eigen space. The coordinates of point A are ((sqrt(3)/2), ½) in eigen space, and (0, 1) in Euclidean space. Similarly, the coordinates of point B are (−(sqrt(3)/2), ½) in eigen space, and (−(sqrt(3)/2), −½) in Euclidean space. As a result, the energy distribution of points A and B are seen to be the same in eigen-coordinate space defined by v1, and v2, but different in Euclidean coordinate space.

It remains to be shown how the eigen-matrix V is parameterized. Here we further impose the Householder structure on V to allow a very simple parameterization of V, i.e.

$$V(a) \triangleq \begin{cases} I, & a = e_1 \\ I - pw \square w^H & \text{otherwise} \end{cases} \quad (4)$$

where $w = a - e_1$ and $e_1 [1 \; 0 \; \ldots \; 0]^T$ and $$p = \frac{2}{\|w^H w\|}.$$

I is an identity matrix and the superscript H denotes Hermitian Conjugate. Given this additional parameterization of vector a, the Codebook is now uniquely determined once the three vectors u, c and a are obtained. We denote this codebook as P(u,c,a). The search for an optimal codebook parameterized by these three vectors is described by:

$$P^{optimal}(u, c, a) = \max_{u,c,a} \left\{ \min_{P_i, P_j \in P(u,c,a)} d_{chordal}(P_i, P_j) \right\}$$

Where $d_{chordal}(P_i, P_j)$ denotes the Chordal distance between two codewords $P_i, P_j$. The optimal codebooks for various antenna configurations are tabulated in Table 2. With reference to Table 2 below, there is illustrated the effectiveness of the method of the present invention showing the parameters of several codebooks using the improved Hochwald construction described herein. Note that the first codeword $P_l$ remains formed as columns of the DFT, as is the case in an unadulterated application of the Hochwald construction. The eigen vector a has been added as an additional parameter. In an example of the present invention there is practiced joint optimization over vector a and the first codeword $P_l$, which is, as noted above, an arbitrary unitary matrix. Of particular interest is the last column wherein there is stated the maximum minimum Chordal distance between the codewords of the codebook using the improved Hochwald construction of the present invention versus that of the standard Hochwald contruction. In all instances, the minimum Chordal distance is improved through the implementation of the method of the present invention.

precoding weight matrices, and SNR measurements on spatial directions. Preferably, the index is a string of data comprised of a number of binary bits b. As each codeword corresponds to one and only one index, the maximum number of codewords in a codebook is equal to $2^b$.

TABLE 2

| $N_t$ | $M_t$ | $2^L/(L)$ | $c \triangleq$ $[c_1, \ldots, c_{M_t}]$ Column indices | $u \triangleq$ $[u_1, \ldots, u_{N_t}]$ Rotation Vector | Vector a | Chordal distance (Improved Hochwald)/(Hochwald) |
|---|---|---|---|---|---|---|
| 2 | 1 | 8/(3) | [1] | [1, 4] | [1 0] | 0.1464/0.1464 |
| 3 | 1 | 8/(3) | [1] | [1, 4, 3] | [1 0 0] | 0.6667/0.6667 |
| 3 | 1 | 64/(6) | [1] | [1 26 57] | [1.2518 − 0.6409i −0.4570 − 0.4974i 0.1177 + 0.2360i] | 0.1263/0.1166 |
| 4 | 1 | 8/(3) | [1] | [1, 2, 7, 6] | [1.2895 + 0.3635i 0.5287 − 0.2752i −0.2352 − 0.4247i −0.4040 + 0.1729i] | 0.8282/0.7500 |
| 4 | 1 | 64/(6) | [1] | [1 45 22 49] | [1.3954 − 0.0738i 0.0206 + 0.4326i −0.1658 − 0.5445i 0.5487 − 0.1599i] | 0.3935/0.3643 |
| 5 | 1 | 64/(6) | [1] | [1 17 40 6 39] | [1.1052 − 0.1146i −0.5410 − 0.3587i −0.0773 + 0.6108i −0.1388 − 0.0375i 0.3007 + 0.2538i] | 0.5864/0.5642 |
| 6 | 1 | 64/(6) | [1] | [1 24 60 46 49 39] | [0.9859 + 0.6880i 0.3354 − 0.2254i 0.2202 + 0.1981i −0.0912 + 0.2780i 0.3314 + 0.1186i 0.1675 − 0.1946i] | 0.6810/0.6609 |

Note that each column index $0 <= c <= N_t-1$, c[0] indicates the first column of the DFT matrix D, c=[1] indicates the second column of the DFT matrix D, etc.

Note that, in Table 2, vector a is precisely defined as being formed of both real and imaginary parts. The present application is drawn to all implementations of vector a, as well as deviations from the values of vector a, whether intentional or inadvertent, which might arise in operation such that an implemented vector a is sufficiently close to the value recited above so as to enable use of the codebook.

Figure 3:
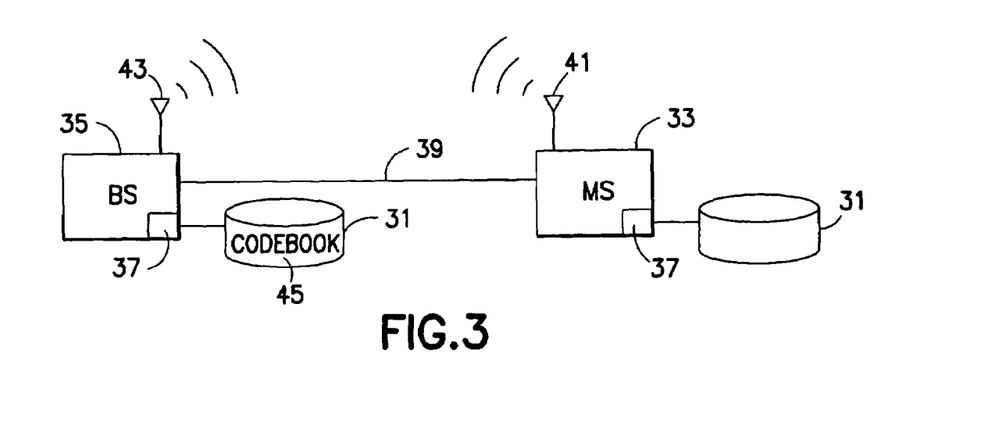
FIG. 3 is a diagram of a base station and a mobile station utilizing a codebook.

Once computed, a codebook constructed according to an example of the present invention can be utilized as illustrated with reference to FIG. 3. Base station 35 is in wireless communication with mobile station 33. Mobile station 33 is any mobile device capable of wireless communication including, but not limited to, wireless telephones, personal digital assistants (PDAs), personal computing devices, and the like. Both base station 35 and mobile station 33 are formed of a digital signal processor (DSP) 37 or another type of data processor for accessing and operating upon digital data. DSP 37 is coupled to a memory device 31 capable of storing digital data. A codebook of the present invention is preferably stored upon each memory device 31 coupled singularly to the base station 35 and the mobile station 33.

The DSP 37 of mobile station 33 selects the index for the codeword corresponding to the information that the mobile station 33 wishes to transmit to base station 35. Examples of the kind of data corresponding to the codewords of the codebook include, but are not limited to, channel information in the form of channel matrices, data receipt acknowledgement, Typically, there will not exist a codeword that is precisely equal to the information to be transmitted. Typically, such information is in the form of a matrix so as to form an information matrix. It is for this reason that the methodology of the present invention serves to evenly distribute, or, more precisely, to maximize the minimum chordal distance between, codewords. By so doing, information can be transmitted by sending the index of the codeword that is closest to the information matrix, such as for example a channel matrix, in the multidimensional Grassmannian manifold with a minimum loss of accuracy. The DSP 37 of the mobile station functions to perform a calculation or calculations as directed by software or hardware encoded logic to select the codeword of the codebook that is closest to the information to be transmitted so as to obtain the index corresponding to the codeword so selected.

The index so derived is typically transmitted by the mobile station 33 by at least one transmit antenna 41 via a feedback loop 39 to the base station 35. The base station 35 receives the transmitted index through the use of at least one receive antenna 43. As noted, base station 35 is similarly equipped with a DSP 37 in communication with a memory device 31 upon which is stored the codebook 45. Using the received index, the DSP 37 of the base station operates through the execution of software or hardware encoded logic to retrieve the corresponding codeword from the codebook 45.

As noted above, the examples of this invention may be implemented by computer software executable by a data processor of the MS 33, or by hardware circuitry, or by a combination of software and hardware circuitry. The MS may be one component of a wireless communication system. Further in this regard it should be noted that the various blocks of the logic flow diagram of FIG. 1 may represent program steps, or interconnected logic circuits, blocks and functions, or a combination of program steps and logic circuits, blocks and functions for performing the specified tasks.

Figure 4:
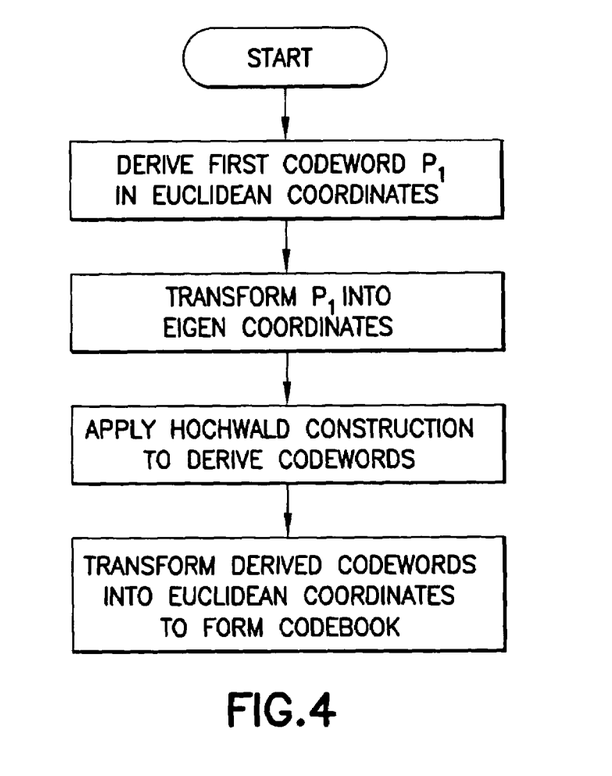
FIG. 4 is a flow chart of the method of the invention.

With reference to FIG. 4, there is illustrated a flow chart of an example of the method of the invention.

Although described in the context of particular examples, it will be apparent to those skilled in the art that a number of modifications and various changes to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above.

What is claimed is:

1. A memory device tangibly embodying a data structure, the data structure comprising:
   a first codeword $P_l$; and
   a plurality of codewords $P_l$, $l=2 \ldots 2^L$, where $2^L$ comprises a number of said plurality of codewords wherein $P_l = VQ^l V^H P_l$ where V comprises a unitary matrix comprising eigen vectors, Q comprises a diagonal matrix, and $V_H$ comprises a hermitian eigen matrix, wherein said data structure is further configured to be accessed by processing apparatus of an electronic device operative in a wireless communications network so that the codewords can be used by the electronic device to perform communication operations.

2. The memory device claim 1 wherein said first codeword and said plurality of codewords are in Euclidean coordinates.

3. A mobile station comprising:
   a memory device storing a codebook, said codebook comprising:
      a first codeword $P_l$; and
      a plurality of codewords $P_l$, $l=2 \ldots 2^L$, where L comprises a number of said plurality of codewords wherein $P_l = VQ^l V^H P_l$ where V comprises a unitary matrix comprising eigen vectors, Q comprises a diagonal matrix, and $V_H$ comprises a hermitian eigen matrix; and
   a processor configured to access said first codeword and said plurality of codewords so that said codewords can be used by the mobile station to perform communication-related operations in a wireless network.

4. The mobile station of claim 3 further comprising a plurality of indexes each corresponding to an individual one of said first codeword and said plurality of codewords.

5. The mobile station of claim 3 comprising a means for transmitting at least one of said plurality of indexes.

6. A wireless network component comprising:
   a memory device storing a codebook said codebook comprising:
      a first codeword $P_l$; and
      a plurality of codewords $P_l$, $l=2 \ldots 2^L$, where $2^L$ comprises a number of said plurality of codewords wherein $P_l = VQ^l V^H P_l$ where V comprises a unitary matrix comprising eigen vectors, Q comprises a diagonal matrix, and $V_H$ comprises a hermitian eigen matrix; and
   a processor configured to access said first codeword and said plurality of codewords so that said codewords can be used by the wireless network component to perform communication-related operations in a wireless network.

7. The wireless network component of claim 6 further comprising a plurality of indexes each corresponding to an individual one of said first codeword and said plurality of codewords.

8. The wireless network component of claim 6 comprising a means for transmitting at least one of said plurality of indexes.

9. A memory device tangibly embodying a program of machine-readable instructions, said machfne-readable instructions executable by a digital data processor to cause an apparatus to perform actions directed toward the transmission of information in a wireless network, the actions comprising:
   obtaining an information matrix;
   accessing a codebook to select one of a plurality of indexes corresponding to said information matrix said codebook comprising:
      a first codeword $P_l$;
      a plurality of codewords $P_l$, $l=2 \ldots 2^L$, where $2^L$ comprises a number of said plurality of codewords wherein $P_l = VQ^l V^H P_l$ where V comprises a unitary matrix comprising eigen vectors, Q comprises a diagonal matrix, and $V_H$ comprises a hermitian eigen matrix wherein each of said first codeword and said plurality of codewords corresponds to a unique one of said plurality of indexes; and
   transmitting said one of said plurality of indexes to a device operative in the wireless network so that the device can use the one of said plurality of indexes to select codewords from the codebook for the purpose of using the codewords to perform communication-related operations in the wireless network.

10. The memory device of claim 9 wherein said information matrix is a channel matrix.

11. The memory device of claim 9 wherein said machine-readable medium is disposed in a component of a wireless communication system.

12. A memory device tangibly embodying a program of machine-readable instructions, said machine-readable instructions executable by a digital data processor to cause an apparatus to perform actions directed toward the reception of information in a wireless network, the actions comprising:
   receiving an index; and
   accessing a codebook to select one of a plurality of codewords
      corresponding to said index said codebook comprising:
      a first codeword $P_l$;
      a plurality of codewords $P_l$, $l=2 \ldots 2^L$, where L comprises a number of said plurality of codewords wherein $P_l = VQ^l V^H P_l$ where V comprises a unitary matrix comprising eigen vectors, Q comprises a diagonal matrix, and $V_H$ comprises a hermitian eigen matrix wherein each of said first codeword and said plurality of codewords corresponds to a unique one of said plurality of indexes,
   wherein said codewords are selected for use in performing communication-related operations in the wireless network.

13. The memory device of claim 12 wherein said memory device is disposed in a component of a wireless communication system.

14. An apparatus comprising:
   a memory device storing a codebook said codebook comprising:
      a first codeword $P_l$; and
      a plurality of codewords $P_l$, $l=2 \ldots 2^L$, where $2^L$ comprises a number of said plurality of codewords wherein $P_l = VQ^l V^H P_l$ where V comprises a unitary matrix comprising eigen vectors, Q comprises a diagonal matrix, and $V_H$ comprises a hermitian eigen matrix; and a processor configured to access said first codeword and said plurality of codewords wherein said codewords are accessed for use in performing communication-related operations in a wireless network.

15. The apparatus of claim 14 wherein the memory device further stores machine readable instructions configured to cause the apparatus to perform operations when executed by the processor, the operations comprising:

deriving the first codeword $P_1$ in Euclidean coordinates;

transforming said first codeword into eigen-coordinates;

applying a Hochwald construction to said first codeword in eigen-coordinates to derive the plurality of codewords in eigen-coordinates; and transforming said plurality of codewords in eigen-coordinates into a plurality of codewords in Euclidean coordinates to form said codebook.

16. The apparatus of claim 15 wherein said first codeword is a unitary matrix.

17. The apparatus of claim 15 wherein transforming said first codeword comprises applying a hermitian eigen-matrix $V^H$ to yield $V^H P_1$, wherein V is a unitary matrix of size $N_t \times N_t$ and $P_1$ is a $N_t \times M$, submatrix thererof.

18. The apparatus of claim 17 wherein said plurality of codewords in eigen-coordinates are defined as $Q^l V^H P_l$, where $l=2 \ldots 2^L$, $2^L$ is equal to a number of said plurality of codewords, and Q is a diagonal matrix.

19. The apparatus of claim 17 wherein a parameter of an optimal codebook is generated by $$P^{optimal}(u, c, a) = \max_{u,c,a} \left\{ \min_{P_i, P_j \in P(u,c,a)} d_{chordal}(P_i, P_j) \right\}$$

where $d_{chordal}(P_i, P_j)$ comprises a Chordal distance between two codewords $P_i$, $P_j$.

20. The apparatus of claim 14 wherein the memory device further stores machine readable instructions configured to cause the apparatus to perform operations when executed by the processor, the operations comprising:

obtaining an information matrix;

accessing the codebook to select one of a plurality of indexes corresponding to said information matrix; and transmitting said one of said plurality of indexes to a device in the wireless network so that the device can use the one of said plurality of indexes to select codewords from the codebook for the purpose of using the codewords to perform communication operations in the wireless network.

21. The apparatus of claim 14 wherein the memory device further stores machine readable instructions configured to cause the apparatus to perform operations when executed by the processor, the operations comprising:

receiving an index; and accessing the codebook to select one of a plurality of codewords corresponding to said index, wherein the codewords are selected for use in performing communication operations in the wireless network.

22. A method comprising:

storing a codebook in a memory device of an apparatus operative in a wireless network, said codebook comprising:

a first codeword $P_1$; and a plurality of codewords $P_l$, $l=2 \ldots 2^L$, where $2^L$ comprises a number of said plurality of codewords wherein $P_l = V Q^l V^H P_1$ where V comprises a unitary matrix comprising eigen vectors, Q comprises a diagonal matrix, and $V_H$ comprises a hermitian eigen matrix; and a processor accessing said first codeword and said plurality of codewords for use in performing communication operations in the wireless network.

23. The method of claim 22 further comprising:

deriving the first codeword $P_1$ in Euclidean coordinates;

transforming said first codeword into eigen-coordinates;

applying a Hochwald construction to said first codeword in eigen-coordinates to derive the plurality of codewords in eigen-coordinates; and transforming said plurality of codewords in eigen-coordinates into a plurality of codewords in Euclidean coordinates to form said codebook.

24. The method of claim 23 wherein said first codeword is a unitary matrix.

25. The method of claim 23 wherein transforming said first codeword comprises applying a hermitian eigen-matrix $V^H$ to yield $V^H P_1$ wherein V is a unitary matrix of size $N_t \times N_t$, and $P_1$ is a $N_t \times M$, submatrix thereof.

26. The method of claim 25 wherein said plurality of codewords in eigen-coordinates are defined as $Q^l V^H P_l$, where $l=2 \ldots 2^L$, $2^L$ is equal to a number of said plurality of codewords, and Q is a diagonal matrix.

27. The method of claim 25 wherein a parameter of an optimal codebook is generated by $$P^{optimal}(u, c, a) = \max_{u,c,a} \left\{ \min_{P_i, P_j \in P(u,c,a)} d_{chordal}(P_i, P_j) \right\}$$

where $d_{chordal}(P_i, P_j)$ comprises a Chordal distance between two codewords $P_i$, $P_j$.

28. The method of claim 22 further comprising:

obtaining an information matrix;

accessing the codebook to select one of a plurality of indexes corresponding to said information matrix; and transmitting said one of said plurality of indexes to a device in the wireless network so that the device can use the one of said plurality of indexes to select codewords from the codebook for the purpose of using the codewords to perform communication operations in the wireless network.

* * * * *

UNITED STATES PATENT AND TRADEMARK OFFICE
CERTIFICATE OF CORRECTION

PATENT NO. : 7,630,886 B2  Page 1 of 3
APPLICATION NO. : 11/119513
DATED : December 8, 2009
INVENTOR(S) : Zhang et al.

It is certified that error appears in the above-identified patent and that said Letters Patent is hereby corrected as shown below:

On the Title/Data Page, Column 2, Line 2 in the Abstract, delete "codeword $P_l$" and replace with --codeword $P_1$--.

In the Background, Column 2, line 8, delete "codeword $P_l$" and replace with --codeword $P_1$--.

In the Background, Column 2, line 15, delete "$P_l=Q^1P_l$, for l=2...$2^L$," and replace with --$P_l=Q^1P_1$, for l=2...$2^L$,--.

In the Background, Column 2, line 32, delete "codeword $P_l$" and replace with --codeword $P_1$--.

In the Summary, Column 3, line 38, delete "codeword $P_l$" and replace with --codeword $P_1$--.

In the Summary, Column 3, line 47, delete "codeword $P_l$" and replace with --codeword $P_1$--.

In the Summary, Column 3, line 49, delete "$P_l=VQ^1V^HP_l$" and replace with --$P_l=VQ^1V^HP_1$--.

In the Summary, Column 3, line 54, delete "codeword $P_l$" and replace with --codeword $P_1$--.

In the Summary, Column 3, line 56, delete "$P_l=VQ^1V^HP_l$" and replace with --$P_l=VQ^1V^HP_1$--.

In the Summary, Column 3, line 64, delete "codeword $P_l$" and replace with --codeword $P_1$--.

In the Summary, Column 3, line 66, delete "$P_l=VQ^1V^HP_l$" and replace with --$P_l=VQ^1V^HP_1$--.

In the Summary, Column 4, line 11, delete "codeword $P_l$" and replace with --codeword $P_1$--.

In the Summary, Column 4, line 13, delete "$P_l=VQ^1V^HP_l$" and replace with --$P_l=VQ^1V^HP_1$--.

In the Summary, Column 4, line 26, delete "codeword $P_l$" and replace with --codeword $P_1$--.

In the Summary, Column 4, line 28, delete "$P_l=VQ^1V^HP_l$" and replace with --$P_l=VQ^1V^HP_1$--.

In the Detailed Description, Column 5, line 21, delete "$P_l=Q^1P_l$, for l=2...$2^L$," and replace with --$P_l=Q^1 P_1$, for l=2...$2^L$,--.

In the Detailed Description, Column 5, line 22, delete "codeword $P_l$" and replace with --codeword $P_1$--.

In the Summary, Column 5, line 24, delete "allowing $P_l$" and replace with --allowing $P_1$--.

CERTIFICATE OF CORRECTION (continued)

In the Detailed Description, Column 5, line 33, delete "codeword $P_l$" and replace with --codeword $P_1$--.

In the Detailed Description, Column 5, line 51, delete "$P_l=S^l P_l=(VQV^H)^l P_l=VQ^l V^H P_l$, for 1=2....$2^L$," and replace with --$P_1=S^1 P_1=(VQV^H)^1 P_1=VQ^1 V^H P_1$, for 1=2....$2^L$,--.

In the Detailed Description, Column 5, line 57, delete "codeword, $p_l$" and replace with --codeword, $p_1$--.

In the Detailed Description, Column 5, line 59, delete "to $p_l$" and replace with --to $p_1$--; also delete "$V^H P_l$" and replace with --$V^H P_1$--.

In the Detailed Description, Column 5, line 61, delete "$V^H P_l$" and replace with --$V^H P_1$--.

In the Detailed Description, Column 5, line 62, delete "$Q^l V^H P_l$" and replace with --$Q^l V^H P_1$--.

In the Detailed Description, Column 5, line 65, delete "$P_l=VQ^l V^H P_l$" and replace with --$P_l=VQ^l V^H P_1$--.

In the Detailed Description, Column 6, line 1, delete "$Q^l V^H P_l$" and replace with --$Q^l V^H P_1$--.

In the Detailed Description, Column 6, line 4, delete "$P_l=VQ^1 V^H P_l$" and replace with --$P_l=VQ^1 V^H P_1$--.

In the Detailed Description, Column 6, line 60, delete "word $P_l$" and replace with --word $P_1$--.

In the Detailed Description, Column 6, line 65, delete "word $P_l$" and replace with --word $P_1$--

In the Claims, Column 9, Claim 1, line 20, delete "codeword $P_l$" and replace with --codeword $P_1$--.

In the Claims, Column 9, Claim 1, line 23, delete "$P_l=VQ^1 V^H P_l$" and replace with --$P_l=VQ^1 V^H P_1$--.

In the Claims, Column 9, Claim 3, line 36, delete "codeword $P_l$" and replace with --codeword $P_1$--.

In the Claims, Column 9, Claim 1, line 39, delete "$P_l=VQ^1 V^H P_l$" and replace with --$P_l=VQ^1 V^H P_1$--.

In the Claims, Column 9, Claim 6, line 56, delete "codeword $P_l$" and replace with --codeword $P_1$--.

In the Claims, Column 9, Claim 6, line 59, delete "$P_l=VQ^1 V^H P_l$" and replace with --$P_l=VQ^1 V^H P_1$--.

In the Claims, Column 10, Claim 9, line 17, delete "codeword $P_l$" and replace with --codeword $P_1$--.

In the Claims, Column 10, Claim 9, line 20, delete "$P_l=VQ^1 V^H P_l$" and replace with --$P_l=VQ^1 V^H P_1$--.

In the Claims, Column 10, Claim 12, line 46, delete "codeword $P_l$" and replace with --codeword $P_1$--.

In the Claims, Column 10, Claim 12, line 49, delete "$P_l=VQ^1 V^H P_l$" and replace with --$P_l=VQ^1 V^H P_1$--.

CERTIFICATE OF CORRECTION (continued)
U.S. Pat. No. 7,630,886 B2

In the Claims, Column 10, Claim 14, line 64, delete "codeword $P_l$" and replace with --codeword $P_1$--.

In the Claims, Column 10, Claim 14, line 67, delete "$P_l=VQ^1V^HP_l$" and replace with --$P_l=VQ^1V^HP_1$--.

In the Claims, Column 11, Claim 15, line 13, delete "codeword $P_l$" and replace with --codeword $P_1$--.

In the Claims, Column 11, Claim 17, line 25, delete "yield $V^HP_l$" and replace with --yield $V^HP_1$--.

In the Claims, Column 11, Claim 17, line 27, delete "and $P_l$" and replace with --and $P_1$--.

In the Claims, Column 11, Claim 18, line 29, delete "$Q^1V^HP_l$" and replace with --$Q^1V^HP_1$--.

In the Claims, Column 12, Claim 22, line 10, delete "codeword $P_l$" and replace with --codeword $P_1$--.

In the Claims, Column 12, Claim 22, line 13, delete "$P_l=VQ^1V^HP_l$" and replace with --$P_l=VQ^1V^HP_1$--.

In the Claims, Column 12, Claim 23, line 21, delete "codeword $P_l$" and replace with --codeword $P_1$--.

In the Claims, Column 12, Claim 25, line 33, delete "yield $V^HP_l$" and replace with --yield $V^HP_1$--; also delete "and $P_l$" and replace with --and $P_1$--.

In the Claims, Column 12, Claim 26, line 36, delete "as $Q^1V^HP_l$" and replace with --as $Q^1V^HP_1$--.

Signed and Sealed this

Thirteenth Day of April, 2010

David J. Kappos
*Director of the United States Patent and Trademark Office*